3,194,761
PREPARATION OF OVERBASED SULPHURIZED CALCIUM ALKYLPHENATE LUBRICANT ADDITIVES
William Joseph Fox, Cottingham, and John Pennington, Hull, England, assignors to The Distillers Company Limited, Edinburgh, Scotland, a British company
No Drawing. Filed Mar. 3, 1961, Ser. No. 93,037
Claims priority, application Great Britain, Mar. 16, 1960, 9,198/60
7 Claims. (Cl. 252—42.7)

The present invention relates to highly basic additives to lubricants.

Basic lubricant additives are known which may be prepared by reacting together lubricating oil, an alkyl-phenol, lime, elemental sulphur and ethylene glycol to produce a mixture of lubricating oil and sulphurised calcium alkylphenate. This mixture may then be added to a lubricant, particularly advantageously to a lubricant for diesel engines operated on low-grade fuel oil of high sulphur content, in order to neutralise or partly neutralise the corrosive acids produced by combustion. The basicity of the additive, and hence its value as a neutraliser of the acid products of combustion, may be increased by incorporating more lime into the composition than the stoichiometric proportion required for a neutral salt of the sulphurised alkylphenol; the product is then said to be "overbased."

The alkaline earth metal content of the additive, which is a measure of the basicity or acid neutralising power, may be increased by overbasing for example from 3.9–4.5% to 4.8–5.2% by weight of calcium but the viscosity of the additive is also increased, often very considerably, in achieving this relatively small increase in basicity, and such an increase in viscosity makes the additive more difficult to handle.

It is an object of the present invention to provide an improved basic oil additive, of value in lubricating oils in general and in hydrocarbon fuels.

According to the present invention the process for the production of a basic lubricant additive comprises heating a mixture of a lubricating oil and a sulphurised alkaline earth metal alkylphenate with carbon dioxide, and reacting the product with an alkaline earth metal hydroxide in the presence of a vicinal glycol.

The sulphurised alkaline earth metal alkylphenate is preferably a sulphurised calcium alkylphenate. The sulphurised alkaline earth metal alkylphenate may be produced, for example, by heating a mixture of a lubricating oil, an alkylphenol, an alkaline earth metal hydroxide, elemental sulphur and a vicinal glycol. The alakline earth metal hydroxide is preferably calcium hydroxide. The vicinal glycol is preferably a 1:2-diol; it is particularly preferred to use ethylene glycol.

The process may be carried out, for example, by heating a solution of a sulphurised alkaline earth metal alkylphenate in lubricating oil with carbon dioxide, for example at a temperature in the range 80° C. to 180° C., adding to the product an alkaline earth metal hydroxide and a vicinal glycol, and then removing the glycol and some water by distillation, for example under reduced pressure. The vicinal glycol is, again, preferably a 1:2 diol and ethylene glycol is particularly preferred. The process may also be carried out by heating together lubricating oil, an alkylphenol, an alkaline earth metal hydroxide, sulphur and a glycol, removing the water formed and contacting the resulting mixture with carbon dioxide, adding to the product more of the alkaline earth metal hydroxide and then removing the glycol and water as before.

The lubricating oil and the sulphurised alkaline earth metal alkylphenate are preferably treated with carbon dioxide to such an extent that not more than one mole of carbon dioxide is taken up to form the carbonated product per two moles of alkaline earth metal in the sulphurised alkaline earth metal alkylphenate. Heating with carbon dioxide after the stoichiometric proportion of carbon dioxide has reacted with the alkaline earth metal of the sulphurised alkaline earth metal alkylphenate may result in poor yields of the desired additive in the subsequent reaction with the alkaline earth metal hydroxide, or may lead to the formation in that reaction of an additive composition which cannot readily be filtered.

The product of heating the lubricating oil and the sulphurised alkaline earth metal alkylphenate with carbon dioxide is a solution in or mixture with lubricating oil of a compound whose precise nature cannot at present be stated with certainty, but in which it is believed that the carbon dioxide enters into chemical combination with the sulphurised alkaline earth metal alkylphenate. This product is reacted with the alkaline earth metal hydroxide in the presence of the glycol, preferably in such a manner that the number of moles of alkaline earth metal hydroxide taken up by the said product is substantially equal to the number of moles of carbon dioxide taken up in its formation. The product of this further reaction is the desired basic additive, in admixture with the lubricating oil and the glycol. From this mixture, the glycol may be removed by distillation, together with any water present, and the resulting solution may be filtered to give a solution of the basic additive in lubricating oil; and this solution may be used as such as an oil additive, either alone or in combination with other additives having detergent properties, antioxidant properties, etc.

If desired, the basic additive as prepared above, while still in admixture with the lubricating oil and the glycol, may again be heated with carbon dioxide, preferably in such a manner that the number of moles of carbon dioxide taken up by a given amount of additive is not greater than the number of moles of carbon dioxide taken up in the first carbonation of that amount of additive, and then heated with not more than that amount of the alkaline earth metal hydroxide which is the stoichiometric equivalent of the carbon dioxide taken up in the second carbonation. The procedure of further heating with carbon dioxide and further reaction with alkaline earth metal hydroxide may be again repeated if desired. In any case the glycol is removed from the final product by distillation and the resulting solution of basic additive in lubricating oil is freed from any solid matter by filtration.

The structure of the basic additive obtained according to the process of the invention cannot at present be stated with certainty; it is considered that the increase in basicity of the additive in the process of the invention is principally the result of chemical reaction rather than of the physical dispersion in the liquid mixture of an alkaline earth metal carbonate formed in situ, since the viscosities of the additives prepared according to the method of this invention are, in general, very substantially lower than those of similar additives prepared by a method in which a suspension of alkaline earth metal carbonate is undoubtedly formed.

The process of the invention is further illustrated by the following examples. In these examples parts by weight bear the same relationship to parts by volume as do kilograms to litres. The alkyl phenol used in the examples was obtained by alkylating phenol with propylene tetramer.

*Example 1*

173 parts by weight of alkylphenol of hydroxyl value 180, 140 parts by volume of lubricating oil, 37.4 parts by weight of calcium hydroxide and 23 parts by weight of sulphur were mixed and heated at 135° C. 70 parts by volume of ethylene glycol were added; the pressure was reduced to 250 millimetres of mercury and the temperature was maintained at 130° C. for an hour. The pressure was raised to atmospheric pressure and the temperature to 150° C.; carbon dioxide was passed through the mixture for 3 hours.

The temperature was reduced to 130° C. and 18.7 parts by weight of calcium hydroxide were added. The pressure was reduced to 250 millimetres of mercury and the temperature was raised, over an hour, from 130° C. to 150° C., water being distilled off. 95 parts by volume of lubricating oil were added; the pressure was reduced to 15 millimetres of mercury and the temperature was raised, over an hour, to 190° C., the ethylene glycol being distilled off. The product was cooled and filtered.

The filtrate had a calcium content of 6.27% by weight and a viscosity of 4,530 S.S.U (Seconds, Saybolt Universal) at 100° F.

Example 2

174.5 parts by weight of alkylphenol of hydroxyl value 180, 140 parts by volume of lubricating oil, 37.4 parts by weight of calcium hydroxide and 23 parts by weight of sulphur were mixed, and heated to 135° C. 70 parts by volume of ethylene glycol were added; the pressure was reduced to 250 millimetres of mercury and the temperature was maintained at 130° C. for 1.5 hours.

The pressure was raised to atmospheric pressure and the temperature to 150° C.; carbon dioxide was passed through the mixture for 3 hours.

The temperature was reduced to 130° C. and 18.7 parts by weight of calcium hydroxide were added. The pressure was reduced to 250 millimetres of mercury and the temperature was raised during 1.5 hours from 130° to 150° C., water being distilled out.

A second, similar, carbonation and subsequent lime addition followed.

85 parts by volume of lubricating oil were added; the pressure was reduced to 15 millimetres of mercury and the temperature raised during an hour to 190° C., the ethylene glycol being distilled off. The product was cooled and filtered.

The filtrate had a calcium content of 7.6% by weight and a viscosity of 4,490 S.S.U. at 100° F.

Example 3

Included by way of comparison with the above examples is the following example of the production of an overbased sulphurised calcium alkylphenate in which the carbon dioxide treatment was not applied.

186.9 parts by weight of alkylphenol of hydroxyl value 180, 115.6 parts by volume of lubricating oil, 53.8 parts by weight of calcium hydroxide and 33.6 parts by weight of sulphur were mixed and heated at 130° C., for an hour. 90 parts by volume of ethylene glycol were then added and the mixture was kept at 130° C. and 290 millimetres of mercury pressure for 1.5 hours while water was distilled off. 115.6 parts by weight of lubricating oil were added. The pressure was reduced to 15 millimetres of mercury and the temperature was raised to 190° C. during 3 hours while the ethylene glycol was distilled off and the final pressure and temperature were maintained for a further hour. The product was cooled to 120° C. and filtered; it had a calcium content of 5.18% by weight and a viscosity of 12,100 S.S.U. at 100° F.

Example 4

The overbased sulphurised calcium alkylphenate produced in Example 3, was heated at 150° C. and at atmospheric pressure and carbon dioxide was passed through until the carbon dioxide content exceeded 2%. 100 parts by weight of the product and 3.4 parts by weight of calcium hydroxide were mixed and rapidly heated to 135° C. 6.5 parts by weight of ethylene glycol were added and the mixture was maintained at 130° to 135° C. and 250 millimetres of mercury pressure for three hours while water was removed. During heating for a further 1.5 hours the pressure was gradually reduced to 15 millimetres of mercury and the temperature was gradually increased to 190° C. as the ethylene glycol distilled off. The product was cooled and filtered.

The filtrate had a calcium content of 6.42% and a viscosity of 12,380 S.S.U. at 100° F. Thus for an insignificant increase in viscosity of the additive an increase in calcium content of 1.24% by weight was obtained by applying the process of this invention.

Example 5

As in Example 3, this example illustrates the preparation of an additive by a process in which the carbon dioxide treatment was not applied.

87.8 parts by volume of alkylphenol of hydroxyl value 195, 70 parts by volume of lubricating oil, 21.2 parts by weight of calcium hydroxide and 11.7 parts by weight of sulphur were mixed and heated to 130° C. during 1 hour. 39 parts by volume of ethylene glycol were added and the resulting mixture was kept at 130° C. and at 290 millimetres of mercury pressure for a further 1.5 hours while water was distilled off.

70 parts by volume of lubricating oil were added. The pressure was reduced to 15 millimetres of mercury and the temperature was raised to 190° C. during 3 hours while the ethylene glycol was distilled off and the final temperature and pressure were maintained for a further hour. The product was cooled to 120° C. and filtered.

The resulting mixture, which contained sulphurised calcium alkylphenate, had a calcium content of 4.25% by weight and a viscosity of 8,500 S.S.U. at 100° F.

Example 6

The overbased sulphurised calcium alkylphenate obtained in Example 5 was heated at 150° C., and carbon dioxide was passed through it at this temperature and at atmospheric pressure until the carbon dioxide content of the mixture reached 2% w./w. 400 parts by weight of the product and 13.5 parts by weight of calcium hydroxide were mixed and rapidly heated to 135° C. 25 parts by volume of ethylene glycol were added and the mixture was maintained at 130° to 150° C. and 250 millimetres of mercury pressure for 3 hours while water was removed. During heating for a further 1.5 hours, the pressure was gradually reduced to 15 millimetres of mercury, and the temperature gradually increased to 190° C., as the ethylene glycol distilled off. The product was cooled to 120° C. and filtered.

The filtrate had a calcium content of 6.08% by weight, and its viscosity was only 4,890 S.S.U. at 100° F.

Example 7

182.4 parts by weight of alkylphenol of hydroxyl value 172, 205 parts of volume of lubricating oil, 49 parts by weight of calcium hydroxide, 23 parts by weight of sulphur and 80 parts by volume of propylene-1:2-glycol were mixed and heated to 130° C. The pressure was reduced to 250 millimetres of mercury and the temperature was raised to 150° C. over 1.5 hours. The pressure was raised to that of the atmosphere and carbon dioxide was passed through the mixture; subsequently the pressure was again reduced to 250 millimetres of mercury for 30 minutes.

19 parts by weight of calcium hydroxide were then added and the pressure was maintained at 250 millimetres of mercury and the temperature at 150° C. for 1.5 hours. At the end of this period the pressure was reduced to 15 millimetres of mercury and the temperature raised to 190° C. over a period of one hour, while the propylene glycol distilled off. The product was cooled to 120° C. and filtered.

The filtrate had a calcium content of 6.9%; a similar experiment in which butylene-1:3-glycol was used, however, gave a product with a calcium content of only 3.9%.

We claim:

1. The process for the production of a basic lubricant additive which comprises contacting a mixture of a lubricating oil and a sulfurized calcium alkylphenate with carbon dioxide at a temperature in the range of 80° C. to 180° C. and reacting the product, in admixture with a 1:2 glycol selected from the group consisting of ethylene glycol and propylene-1,2-glycol, with calcium hydroxide, the amount of carbon dioxide being not more than one mole for each two moles of calcium contained in the calcium alkylphenate and the sulfurized calcium alkylphenate being produced by heating together a mixture of a lubricating oil, an alkylphenol, calcium hydroxide, elemental sulfur and the selected 1:2 glycol.

2. The process claimed in claim 1, in which the 1:2 glycol is ethylene glycol.

3. The process claimed in claim 1, in which the 1:2 glycol is propylene-1,2-glycol.

4. The process for the production of a basic lubricant additive which comprises heating together a lubricating oil, an alkylphenol, calcium hydroxide, sulfur and a 1:2 glycol selected from the group consisting of ethylene glycol and propylene-1,2-glycol, removing by distillation the water formed in the reaction, contacting the resulting mixture with carbon dioxide at a temperature in the range of 80° C. to 180° C. and reacting the product with calcium hydroxide.

5. The process for the production of a basic lubricant additive which comprises contacting a mixture of a lubricating oil and a sulfurized calcium alkylphenate with carbon dioxide at a temperature in the range of 80° C. to 180° C., reacting the product, in admixture with a 1:2 glycol selected from the group consisting of ethylene glycol and propylene-1,2-glycol, with calcium hydroxide, contacting the resulting compound while still in solution in the lubricating oil and the selected 1:2 glycol with a further quantity of carbon dioxide and reacting the resulting product with a further quantity of calcium hydroxide.

6. The process claimed in claim 1, in which the 1:2 glycol is subsequently removed from the reaction mixture by distillation.

7. The process claimed in claim 1, in which the final product is subjected to filtration to free it from solids.

References Cited by the Examiner

UNITED STATES PATENTS

| | | | |
|---|---|---|---|
| 2,680,096 | 6/54 | Walker et al. | 252—42.7 |
| 2,762,774 | 9/56 | Popkin | 252—42.7 |
| 2,766,291 | 10/56 | Weissberg et al. | 252—42.7 X |
| 2,916,454 | 12/59 | Brodley et al. | 252—42.7 |
| 3,036,971 | 5/62 | Otto | 252—42.7 |

FOREIGN PATENTS

| | | |
|---|---|---|
| 554,985 | 3/58 | Canada. |
| 743,254 | 1/56 | Great Britain. |

DANIEL E. WYMAN, *Primary Examiner.*

JULIUS GREENWALD, *Examiner.*